(12) United States Patent
Chen

(10) Patent No.: US 6,945,582 B2
(45) Date of Patent: Sep. 20, 2005

(54) CENTRAL ARMREST DISPLAY DEVICE

(75) Inventor: Stephen Chen, Changhua (TW)

(73) Assignee: E-Lead Electronics Co., Ltd., Chang Hua (TW)

( * ) Notice: Subject to any disclaimer, the term of this patent is extended or adjusted under 35 U.S.C. 154(b) by 0 days.

(21) Appl. No.: 10/748,267

(22) Filed: Dec. 31, 2003

(65) Prior Publication Data

US 2005/0140155 A1 Jun. 30, 2005

(51) Int. Cl.[7] .............................................. B60R 11/02

(52) U.S. Cl. .................. 296/37.8; 296/24.34; 224/539; 297/188.17

(58) Field of Search ........................... 296/37.8, 24.34; 224/275, 539, 929, 281; 297/188.16, 188.17

(56) References Cited

U.S. PATENT DOCUMENTS

| | | | |
|---|---|---|---|
| 5,823,599 A * | 10/1998 | Gray ......................... | 296/37.8 |
| 6,279,977 B1 * | 8/2001 | Chen ........................ | 296/24.34 |
| 6,663,155 B1 * | 12/2003 | Malone et al. ............. | 296/37.8 |
| 6,719,343 B2 * | 4/2004 | Emerling et al. ......... | 296/24.34 |
| 6,746,065 B1 * | 6/2004 | Chan ....................... | 296/24.34 |

* cited by examiner

*Primary Examiner*—Joseph D. Pape
(74) *Attorney, Agent, or Firm*—Troxell Law Office, PLLC

(57) ABSTRACT

A central armrest display device includes a body in the central armrest that has a housing compartment with an opening directing rearwards to house and anchor a case. The display device may be erected on the case for viewing or housed in the case. The case can hold a multimedia player. Passengers on the rear seat of a car can see multimedia programs on the display device mounting on the central armrest.

8 Claims, 6 Drawing Sheets

US 6,945,582 B2

CENTRAL ARMREST DISPLAY DEVICE

FIELD OF THE INVENTION

The present invention relates to a central armrest display device for passengers on the rear seat of a car to see multimedia programs.

BACKGROUND OF THE INVENTION

Multimedia apparatus for cars become increasingly popular in recent years. However, the display device for viewing multimedia programs in the car mostly is installed at the front side of the driver (front seat). Passengers on the rear seat have to twist heads to see the pictures on the display device through the gap above the central armrest. Viewing is difficult. Passenger's body has to maintain a twisted posture. To look at the display device in a twisted posture for a long period of time is awkward and uncomfortable. How to improve the situation so that the passengers on the rear seat can also enjoy high quality of viewing as the passengers on the front seat do is an issue pending to be resolved.

SUMMARY OF THE INVENTION

In view of the aforesaid disadvantages, the object of the present invention is to provide a central armrest display device on the central armrest beside the car seat to enable passengers on the rear seat of the car to see multimedia programs conveniently.

In order to achieve the foregoing object, the central armrest display device according to the invention includes a body of the central armrest that has a housing compartment with an opening directing rearwards for housing and anchoring a case. The case can hold a display device for viewing and house the display device for storing. The case further can contain a multimedia player. Thus passengers on the rear seat can see the multimedia programs conveniently.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
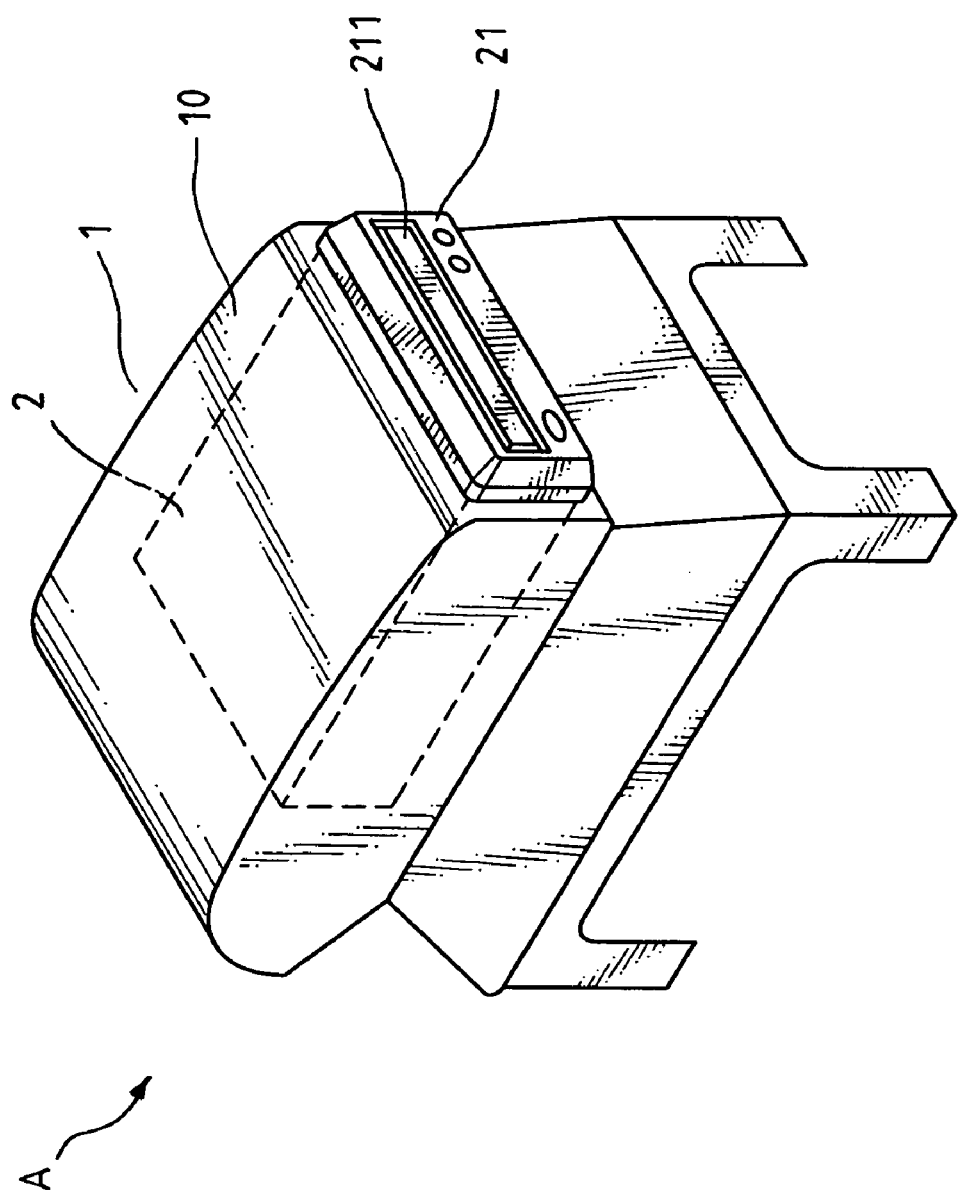
FIG. 1 is a perspective view of the invention.
Figure 2:
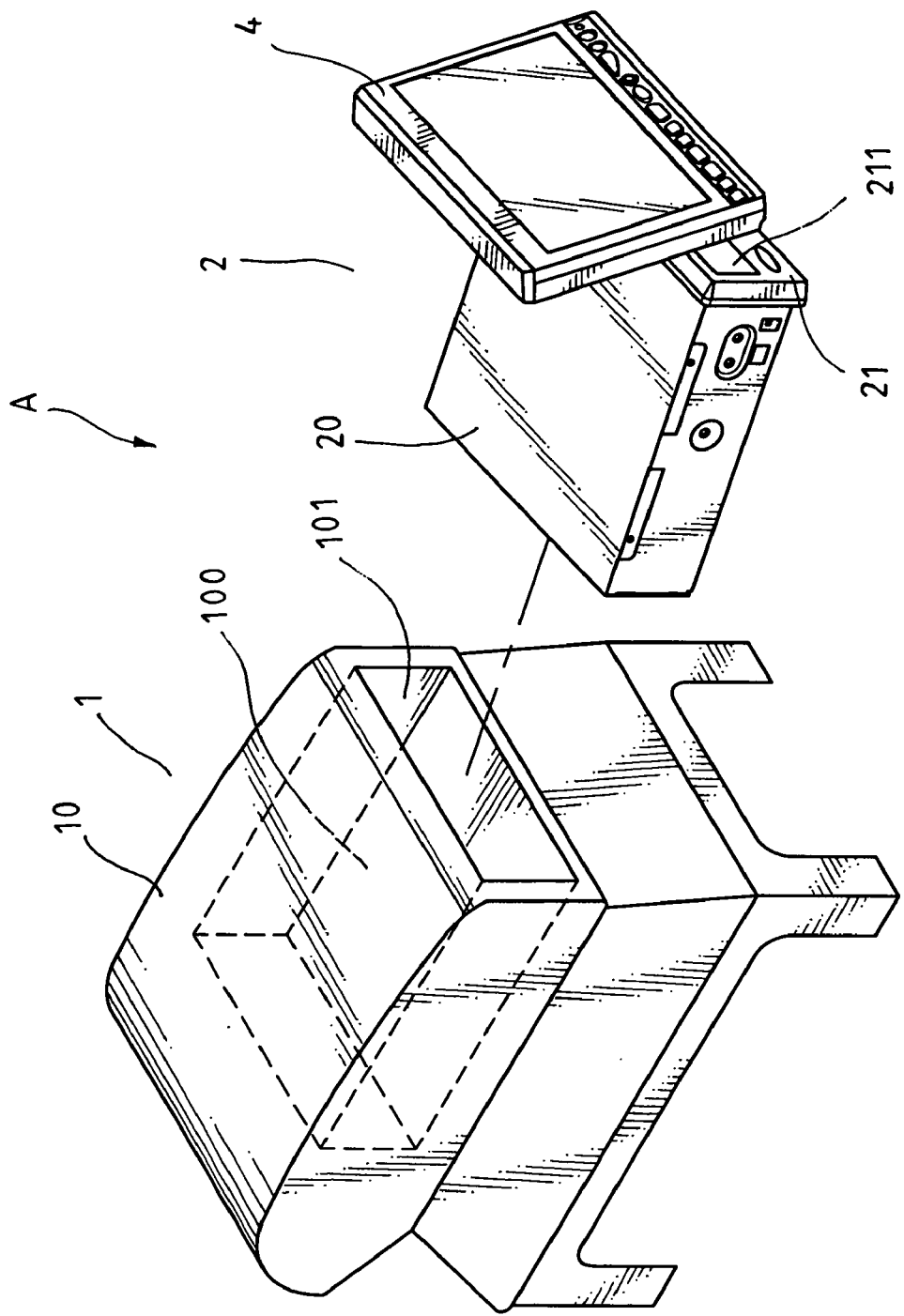
FIG. 2 is an exploded view of the invention.
Figure 3:
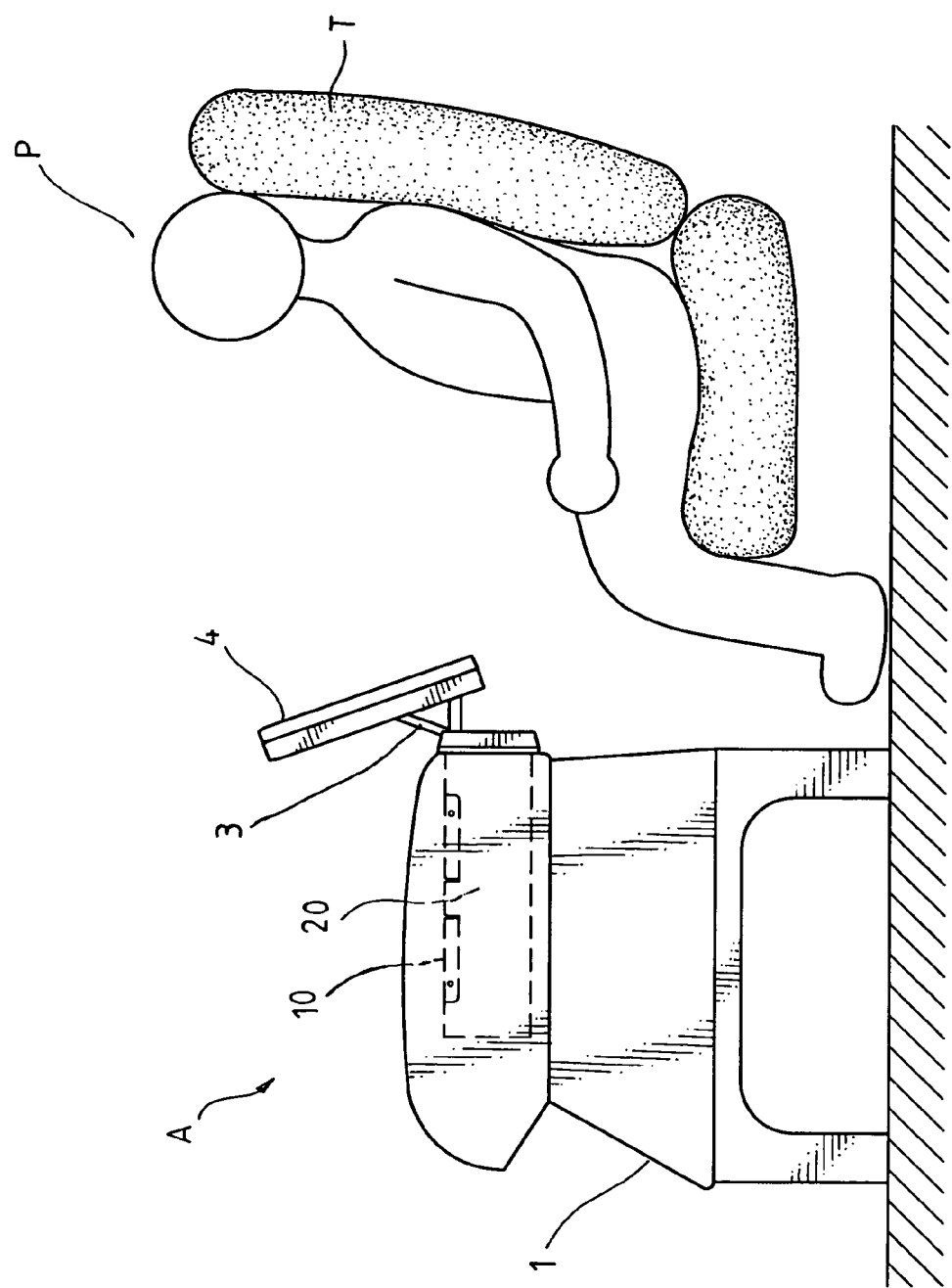
FIG. 3 is a schematic view of an embodiment of the invention.

Referring to FIGS. 1, 2 and 3, the central armrest display device A according to the invention includes a body 10 of a central armrest 1 to house a case 2. The case 2 can hold and house a display device 4.

The central armrest 1 is located on one side of the seat (front seat) in a car. The body 10 has a housing compartment 100 which has an opening 101 directing rearwards to house and anchor the case 2.

The case 2 has a hollow shell 20, a face panel 21 mounting on a front side. The face panel 21 has a transverse window 211 to hold and receive the display device 4. The case 2 also houses a mechanism 3.

The display device 4 is connected to a multimedia player to display multimedia programs for the passengers on the rear seat to see. It is connected to the mechanism 3 located in the case 2, and may be mounted outside the case 2 or be held inside the case 2.

Figure 4:
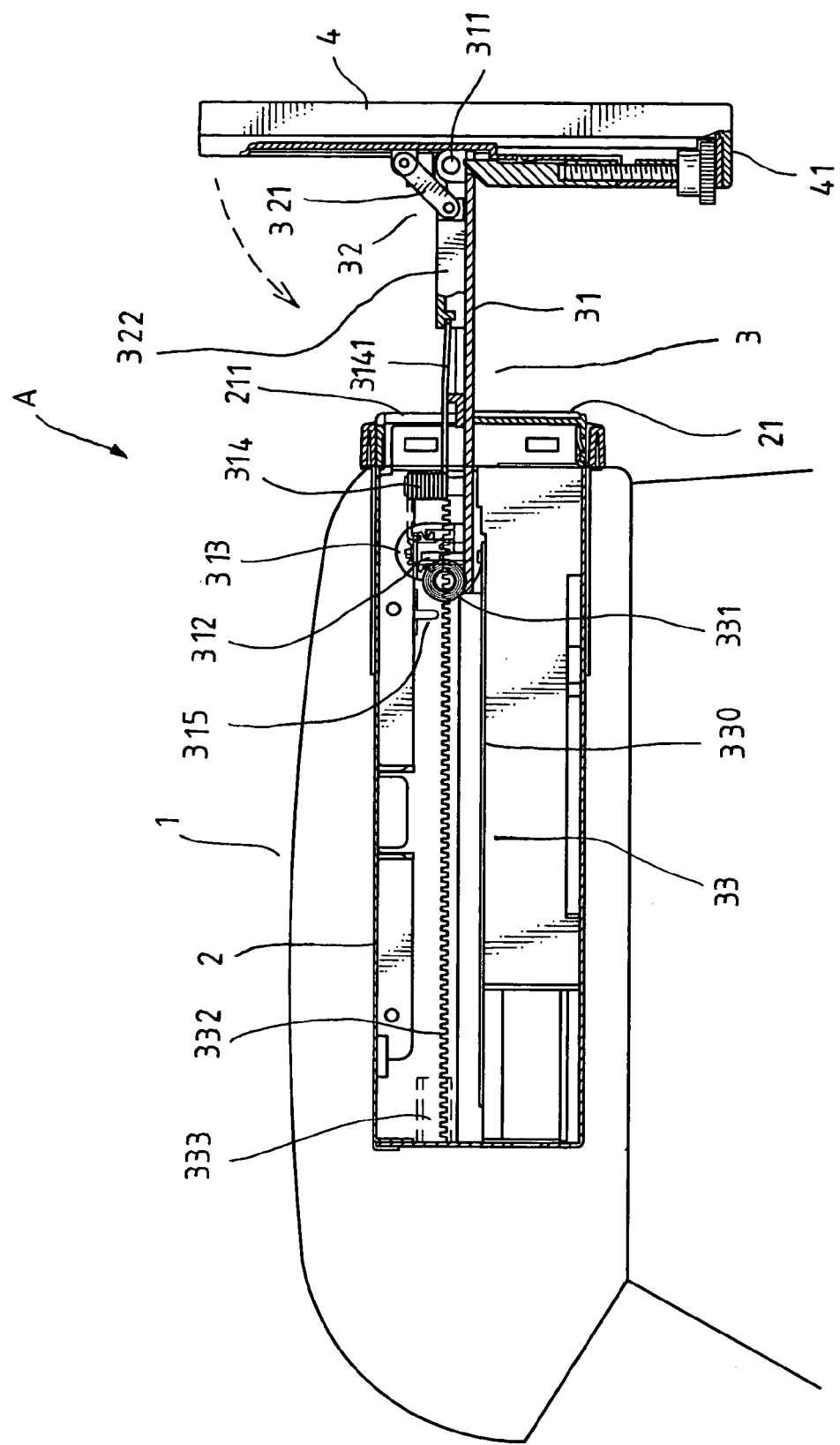
FIG. 4 is a schematic view of the invention in an operating condition.
Figure 5:
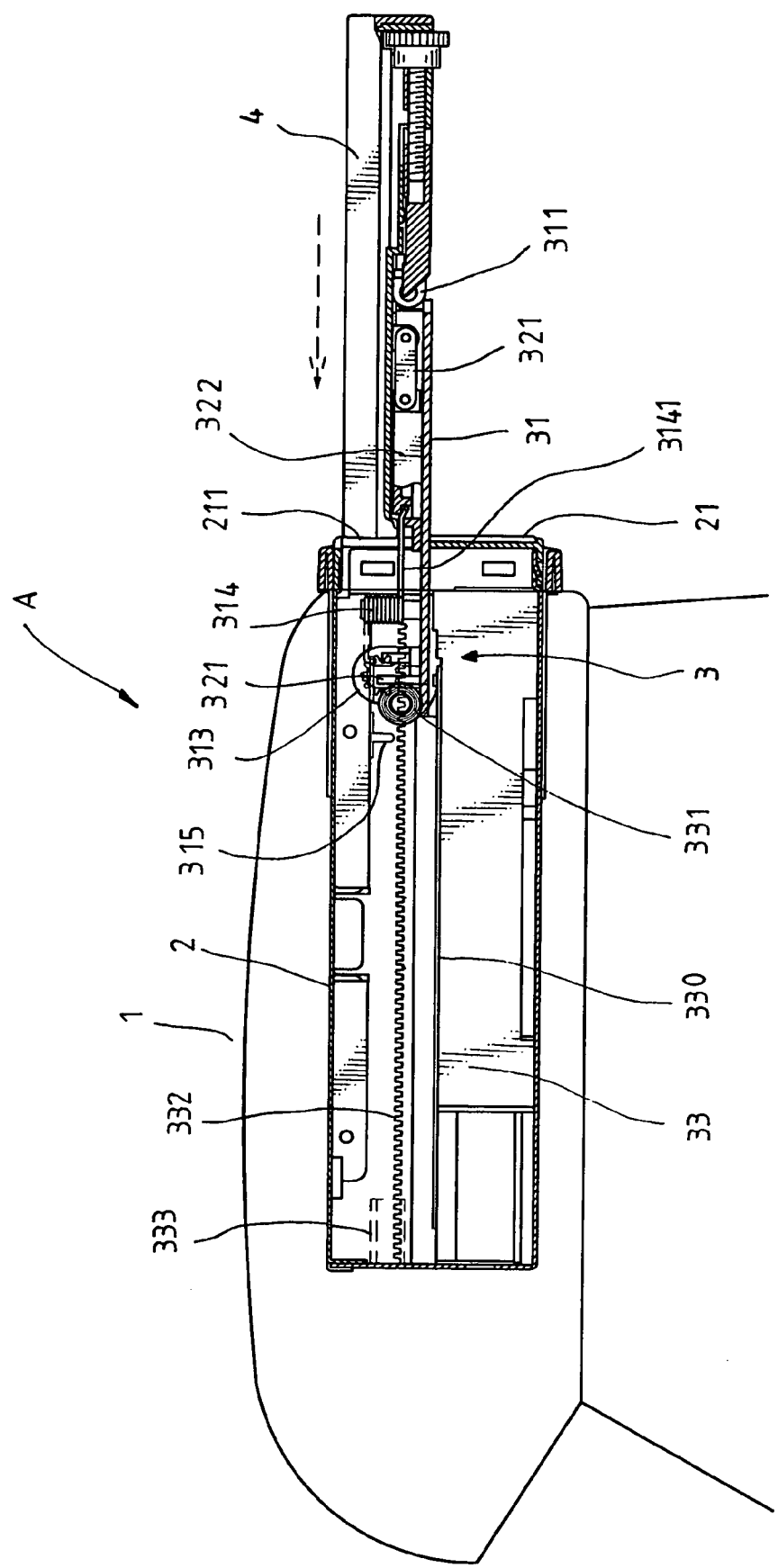
FIG. 5 is a schematic view of the invention in another operating condition.
Figure 6:
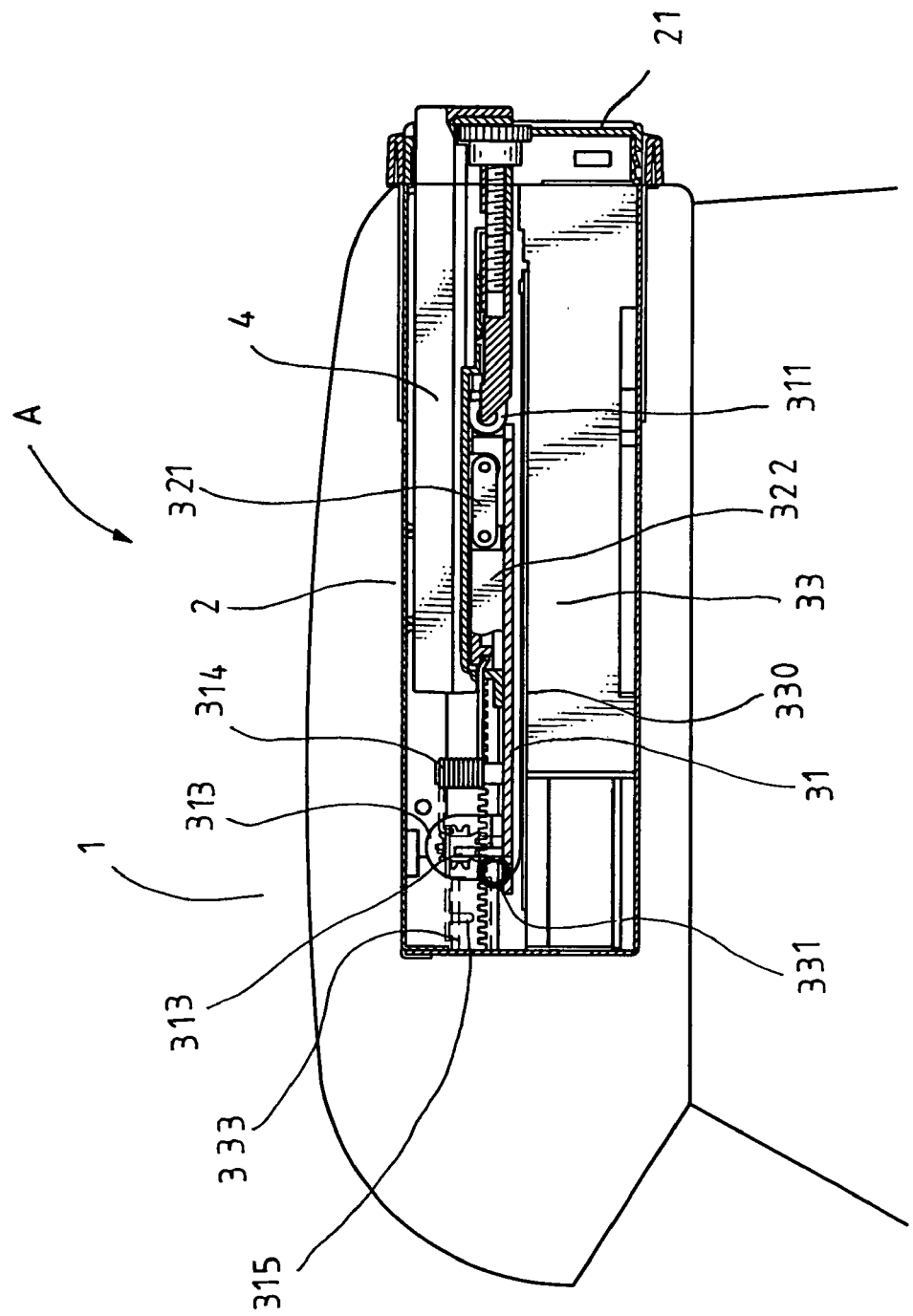
FIG. 6 is a schematic view of the invention in yet another operating condition.

By means of the aforesaid construction, passengers P on the rear seat T of the car can see the multimedia programs on the display device 4 located on the central armrest 1 (as shown in FIG. 3). Refer to FIGS. 4, 5 and 6 for the mechanism 3 of the case 2 to receive and store the display device 4. The mechanism 3 includes a sliding mechanism 31, a folding and turning mechanism 32, and a guide track mechanism 33. The guide track mechanism 33 is located in the case 2 to channel the sliding mechanism 31 to slide inwards and outwards. The sliding mechanism 31 can confine the folding and turning mechanism 32 and is pivotally coupled with the display device 4 to enable the display device to be folded and turned.

The sliding mechanism 31 is a slidable plate with a pivot shaft 311 at the front end to pivotally engage with the back side of the display device 4. It has a rear end with an anchor bar 315 located thereon and at least one push reed 312 and at least one damper 313. It also has an elastic element 314 mounting on a middle section thereof.

The folding and turning mechanism 32 includes a linkage bar 321 and a sliding dock 322. The linkage bar 321 has one end pivotally engaged with the back side of the display device 4 and another end pivotally engaged with a front end of the sliding dock 322. The sliding dock 322 has a rear end pushed by an extension end 3141 of the elastic element 314 in normal conditions.

The guide track mechanism 33 mainly includes parallel guide tracks 330 on two sides of the interior of the case 2 to channel the sliding mechanism 31 to slide inwards and outwards. It has a spring reed 331 at the front end to be pressed by a push reed 312 and an anchor dock 333 at the rear end. The anchor dock 333 is a binary latch switch (a standard element). There is a gear rack 332 in parallel with the guide tracks 330 to engage with the damper 313 to cushion the sliding deceleration of the sliding mechanism 31.

By means of the aforesaid construction, when a user wants to store the display device 4 in the central armrest 1, first, he/she depresses the display device 4 downwards (as shown in FIG. 4). The linkage bar 321 of the folding and turning mechanism 32 will be moved to push the sliding dock 322 rearwards until the display device 4 folding flatly (referring to FIG. 5). User continuously pushes the display device 4 on the bottom end 41, the sliding mechanism 31 is channeled along the guide track mechanism 33 and slides inwards, and the push reed 312 at the rear end pushes the spring reed 331 to extend at the same time until the anchor bar 315 at the rear end is latched on the anchor dock 333 (as shown in FIG. 6). In that condition, the display device 4 is housed in the case 2.

When the user wants to erect the display device 4 to see multimedia programs (the movements are reversed to the receiving and storing movements), he/she depresses the bottom end 41 of the display device 4, the anchor dock 333 releases the anchor bar 315 (as the anchor dock is a binary switch, which is a standard element, it latches and anchors when the anchor bar is latched, and unlatches when pushed by an external force again). The spring reed 331 provides a rolling returning elastic force to push the sliding mechanism 31 outwards until the display device 4 is moved outside the window 211 of the case 2. And the extension end 3141 of the elastic element 314 also has a returning elastic force to push the sliding dock 322 forwards and drive the linkage bar 321 to push the display device 4 in an upright position for passenger viewing.

The display device according to the invention may be linked to a multimedia player to display multimedia signals and programs on the display device for passenger viewing. The multimedia player usually is located at the central control station in front of the driver. It may be connected to the display device of the invention by wiring. The multimedia player may also be housed in the body of the central armrest (especially in the shell). The multimedia player may also be DVD player.

I claim:

1. A central armrest display device located in a body of a central armrest comprising a case for holding and housing a display device, wherein:

the central armrest is located on one side of a car seat in a car, the body having a housing compartment which has an opening directed rearwards to hold and anchor the case;

the case is a hollow shell to house a mechanism and has a face panel at a front side, the face panel having a transverse window; and the display device is to display multimedia programs for rear seat passengers viewing, and is linked to the mechanism in the case, and is erectable outside the case and storable in the case.

2. The central armrest display device of claim 1, wherein the mechanism includes a sliding mechanism, a folding and turning mechanism and a guide track mechanism, the guide track mechanism being located in the case for channeling the sliding mechanism inwards and outwards, the folding and turning mechanism and the display device being confined by the sliding mechanism for folding and erecting.

3. The central armrest display device of claim 2, wherein the sliding mechanism is a slidable plate having a pivot shaft at a front end thereof to pivotally engage with a back side of the display device, and has a rear end which has an anchor bar, at least one push reed and at least one damper, and also has an elastic element mounted on a middle section thereof.

4. The central armrest display device of claim 2, wherein the folding and turning mechanism includes a linkage bar and a sliding dock, the linkage bar having one end pivotally engaged with the back side of the display device and another end pivotally engaged with a front end of the sliding dock, the sliding dock having a rear end pushed by an extension end of an elastic element of the sliding mechanism in normal conditions.

5. The central armrest display device of claim 2, wherein the guide track mechanism includes parallel guide tracks located on two sides of the interior of the case to channel the sliding mechanism to slide inwards and outwards.

6. The central armrest display device of claim 5, wherein the guide track mechanism has a spring reed located at a front end thereof pressed by a push reed.

7. The central armrest display device of claim 5, wherein the guide track mechanism has an anchor dock located at a rear end thereof, the anchor dock being a binary latch switch.

8. The central armrest display device of claim 5, wherein the guide track mechanism has a gear rack in parallel with the guide tracks to engage with a damper to cushion sliding deceleration of the sliding mechanism.

* * * * *